(12) United States Patent
Nakayama (10) Patent No.: US 10,801,604 B2
(45) Date of Patent: Oct. 13, 2020

(54) RELIEF UNIT AND ROBOT

(71) Applicant: FANUC CORPORATION, Yamanashi (JP)

(72) Inventor: Kazutaka Nakayama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 15 days.

(21) Appl. No.: 16/267,735

(22) Filed: Feb. 5, 2019

(65) Prior Publication Data
US 2019/0264795 A1    Aug. 29, 2019

(30) Foreign Application Priority Data

Feb. 23, 2018    (JP) .................................. 2018-030907

(51) Int. Cl.
*B25J 18/00*    (2006.01)
*B25J 19/02*    (2006.01)
(Continued)

(52) U.S. Cl.
CPC ........... *F16H 57/027* (2013.01); *B01D 46/10* (2013.01); *B25J 19/0062* (2013.01);
(Continued)

(58) Field of Classification Search
CPC .... F16H 57/027; F16H 57/0434; F16N 29/00; F16N 31/02; F16N 2210/12;
(Continued)

(56) References Cited

U.S. PATENT DOCUMENTS

| 5,348,570 A | * | 9/1994 | Ruppert, Jr. | ....... B01D 19/0031 55/502 |
| 5,522,769 A | * | 6/1996 | DeGuiseppi | .......... F16H 57/027 454/270 |

(Continued)

FOREIGN PATENT DOCUMENTS

| JP | S59-113573 U | 7/1984 |
| JP | H07-310808 A | 11/1995 |

(Continued)

OTHER PUBLICATIONS

Office Action dated Feb. 12, 2020, in corresponding Japanese Application No. 2018-030907; 11 pages.
Search Report dated Jan. 24, 2020, in corresponding Japanese Application No. 2018-030907; 24 pages.

*Primary Examiner* — Adam D Rogers
(74) *Attorney, Agent, or Firm* — Maier & Maier, PLLC (57) ABSTRACT

A relief unit that is attached to an attachment hole penetrating through a wall of a housing accommodating a power transmission mechanism of a robot together with lubricating oil in a sealed state, which includes a body that is provided with an attachment section attachable to the attachment hole and that forms a communication passage disposed at a position where an internal space of the housing and an external space are connected when the attachment section is attached to the attachment hole. An opening and closing mechanism that is provided in the communication passage, closes the communication passage in a sealed state when the opening and closing mechanism is closed, and that opens the communication passage when the opening and closing mechanism is opened. a catching part is disposed at an intermediate position of the communication passage that catches the lubricating oil.

18 Claims, 5 Drawing Sheets

(51) Int. Cl.
*F16H 57/02* (2012.01)
*F16K 17/02* (2006.01)
*F16K 31/02* (2006.01)
*F16K 31/44* (2006.01)
*F16N 31/02* (2006.01)
*F16H 57/027* (2012.01)
*F16K 17/06* (2006.01)
*B25J 19/00* (2006.01)
*F16H 57/04* (2010.01)
*F16N 29/00* (2006.01)
*B01D 46/10* (2006.01)
*F16K 31/60* (2006.01)

(52) U.S. Cl.
CPC ...... *B25J 19/0079* (2013.01); *F16H 57/0434* (2013.01); *F16K 17/06* (2013.01); *F16K 31/602* (2013.01); *F16N 29/00* (2013.01); *F16N 31/02* (2013.01); *F16N 2250/04* (2013.01)

(58) Field of Classification Search
CPC ............. F16N 2250/04; F16N 2250/05; F16N 2250/06; F16N 2270/60; F16N 2270/62; B01D 46/10; B25J 19/0062; B25J 19/0079; F16K 17/06; F16K 31/602
See application file for complete search history.

(56) References Cited

U.S. PATENT DOCUMENTS

| | | | |
|---|---|---|---|
| 6,447,565 | B1 | 9/2002 | Raszkowski et al. |
| 7,044,150 | B2* | 5/2006 | Seidl ...................... F16H 57/027 137/15.19 |
| 7,604,020 | B2* | 10/2009 | Kennedy ............... F16H 57/027 137/197 |
| 10,081,109 | B2* | 9/2018 | Kowalski ................. B25J 13/06 |
| 2010/0032242 | A1* | 2/2010 | Lin ..................... F16K 17/0406 184/6.12 |
| 2012/0031228 | A1 | 2/2012 | Yanagishima et al. |

FOREIGN PATENT DOCUMENTS

| | | |
|---|---|---|
| JP | H10-068460 A | 3/1998 |
| JP | 2005-226803 A | 8/2005 |
| JP | 2006-284405 A | 10/2006 |
| JP | 2008-164003 A | 7/2008 |
| JP | 3145693 U | 10/2008 |
| JP | 2011-020247 A | 2/2011 |
| JP | 2011-148077 A | 8/2011 |
| JP | 2012-036941 A | 2/2012 |
| JP | 2014-133276 A | 7/2014 |
| JP | 5848588 B2 | 1/2016 |
| JP | 2016-173110 A | 9/2016 |
| JP | 2017-096370 A | 6/2017 |

* cited by examiner

RELIEF UNIT AND ROBOT

CROSS-REFERENCE TO RELATED APPLICATIONS

This application is based on Japanese Patent Application No. 2018-030907, the content of which is incorporated herein by reference.

FIELD

The present invention relates to a relief unit and a robot.

BACKGROUND

In the related art, in a robot in which an arm is driven by power of a motor, there is a known gearbox that is provided with: a housing that accommodates, in a sealed state, a gear for transmitting the power and grease serving as lubricating oil; and a pressure reducing device for depressurizing the inside of the housing (for example, see Japanese Unexamined Patent Application, Publication No. 2014-133276). In the gearbox described in Japanese Unexamined Patent Application, Publication No. 2014-133276, the inside of the housing is depressurized by the pressure reducing device, thereby suppressing an increase in the internal pressure of the housing, which is caused by a rise in temperature due to engagement of gears and heat generation of the motor. Accordingly, leakage of grease in the housing to the outside due to an increased internal pressure is suppressed. Japanese Unexamined Patent Application, Publication No. 2014-133276 describes, as a specific pressure reducing device, a device that uses a suction pump and a device that has a bolt-fastening structure. With the bolt-fastening structure, the length of a bolt to be fastened is changed, thereby increasing the sealed volume in the housing and depressurizing the inside of the housing due to the increased volume.

SUMMARY

The present invention provides the following solutions.

One aspect of the present invention is directed to a relief unit that is attached to an attachment hole penetrating through a wall of a housing that accommodates a power transmission mechanism of a robot together with lubricating oil in a sealed state, the relief unit including: a body that is provided with an attachment section attachable to the attachment hole and that forms a communication passage disposed at a position where an internal space of the housing and an external space are connected when the attachment section is attached to the attachment hole; an opening and closing mechanism that is provided in the communication passage, that closes the communication passage in a sealed state when the opening and closing mechanism is closed, and that opens the communication passage when the opening and closing mechanism is opened; and a catching part that is disposed at an intermediate position of the communication passage and that catches the lubricating oil.

Furthermore, another aspect of the present invention is directed to a robot including: a motor; a mechanism part that is driven by power of the motor; a power transmission mechanism that transmits the power of the motor to the mechanism part; a housing that accommodates the power transmission mechanism together with lubricating oil in a sealed state; and a relief unit according to the above-described aspect, that is attached to an attachment hole penetrating through a wall of the housing, by means of the attachment section.

DETAILED DESCRIPTION

A relief unit and a robot according to an embodiment of the present invention will be described below with reference to the drawings.

Figure 1:
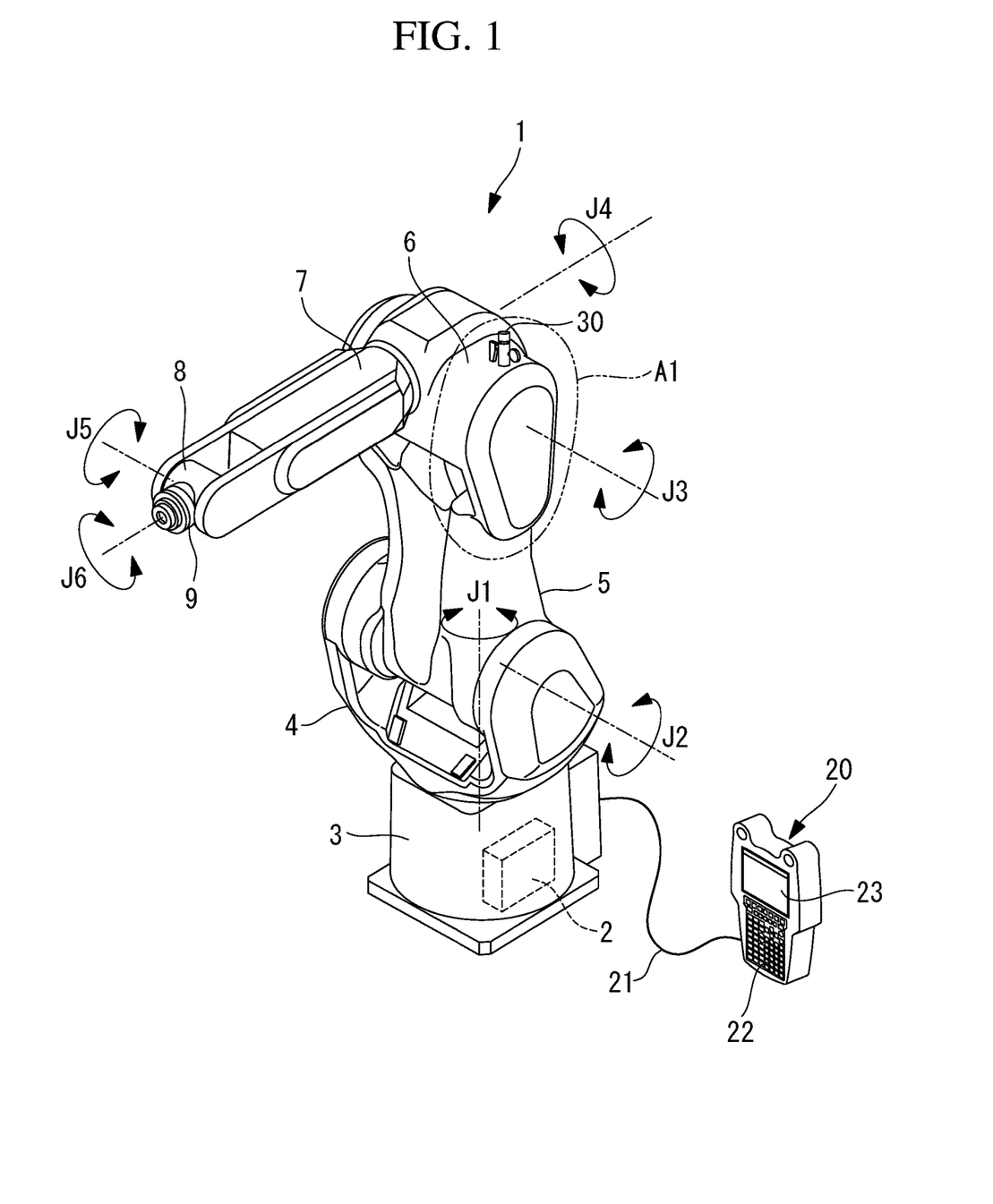
FIG. 1 is a schematic perspective view of a relief unit and a robot according to one embodiment of the present invention.

FIG. 1 is a schematic perspective view of a robot 1 according to the one embodiment of the present invention. The robot 1 of this embodiment is a vertical articulated robot having six joints. The robot 1 is provided with: a base 3 that is fixed to the floor surface; a turning body 4 that is supported so as to be capable of rotating about a vertical first axis J1 with respect to the base 3; a first arm (housing) 5 that is supported so as to be capable of rotating about a horizontal second axis J2 with respect to the turning body 4; a second arm (mechanism part) 6 that is supported so as to be capable of rotating about a horizontal third axis J3 with respect to the first arm 5; a first wrist element 7 that is supported so as to be capable of rotating about a fourth axis J4 that is in a torsional positional relationship with the third axis J3, with respect to the second arm 6; a second wrist element 8 that is supported so as to be capable of rotating about a fifth axis J5 perpendicular to the fourth axis J4, with respect to the first wrist element 7; a third wrist element 9 that is supported so as to be capable of rotating about a sixth axis J6 perpendicular to the fifth axis J5, with respect to the second wrist element 8; a control device 2 that controls the motions of the six joints; a teach pendant 20 that is connected to the control device 2; and a relief unit 30 according to the one embodiment of the present invention, that is attached to the first arm 5.

Each of the joints is provided with a motor (not shown) for rotationally driving the joint and an encoder (not shown) for detecting the rotation angle of the motor. The control device 2 performs feedback control for rotationally driving the respective motors, by using the rotation angles of the motors detected by the encoders of the six joints. The control device 2 is provided with a CPU, a ROM, a RAM, and a memory that are not shown.

The teach pendant 20 is connected to the control device 2 via a cable 21. The teach pendant 20 is provided with: an operation panel (operation unit) 22 that receives an operation of the operator; and a monitor (display unit) 23 that can display the control content for the robot 1. In other words, the operation panel 22 and the monitor 23 are integrally formed as the teach pendant 20. The control device 2 controls the rotation angles of the motors of the respective joints on the basis of an operation received by the operation panel 22.

Figure 2:
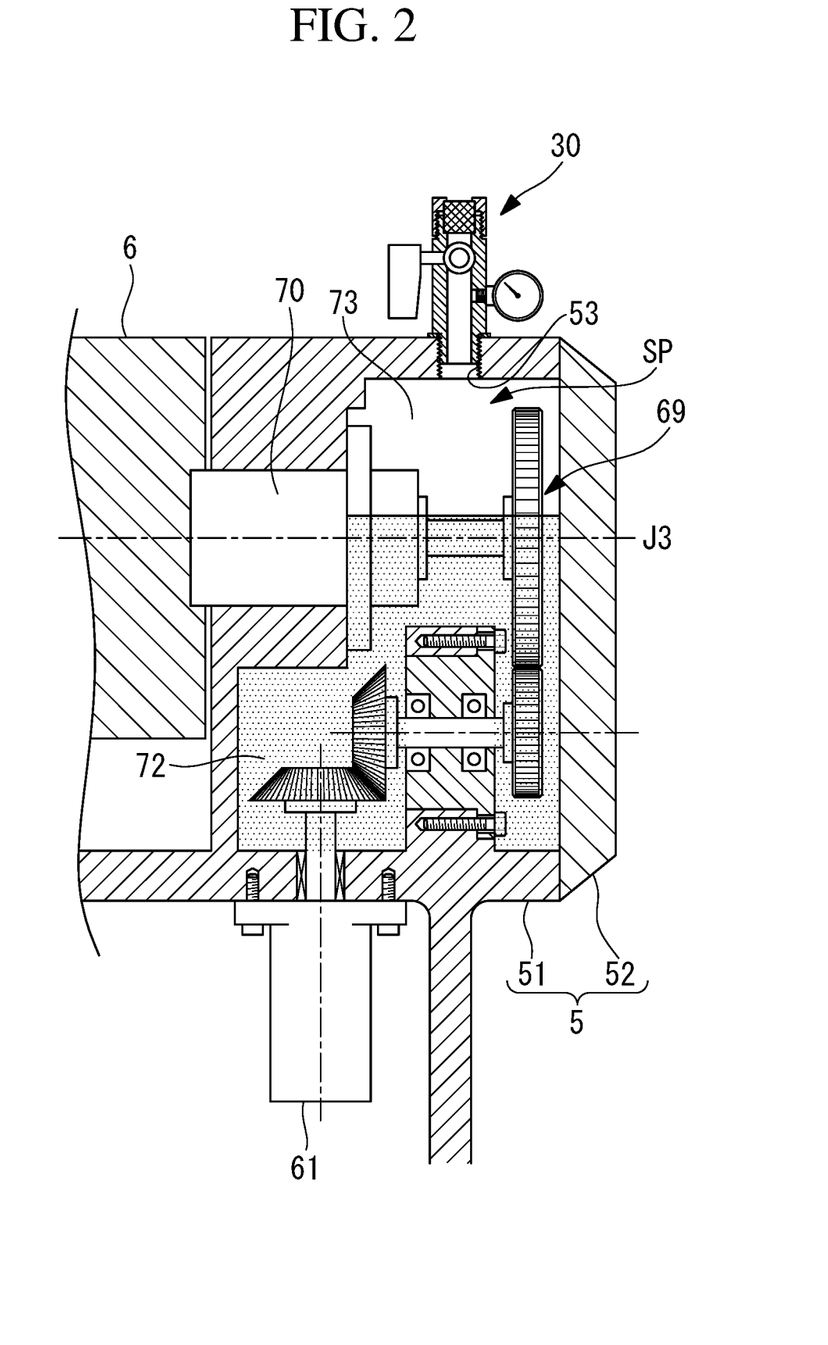
FIG. 2 is a sectional schematic view of a section A1 shown in FIG. 1.

FIG. 2 is a schematic sectional view of a section A1 shown in FIG. 1, in a vertical plane including the third axis J3. As shown in FIG. 2, the first arm 5 is provided with: an arm body part 51 to which a J3-axis motor (motor) 61 and a reducer 70 that rotationally drive the second arm 6 about the third axis J3 are fixed; and an arm cover 52 that is attached to a side surface of the arm body part 51 so as to be perpendicular to the third axis J3.

A gear group 69 that reduces the speed of rotation of the motor 61 and that transmits the reduced rotation to the reducer 70 is disposed between the motor 61 and the reducer 70. The gear group 69 and the reducer 70 are accommodated in an internal space SP that is sealed by the arm body part 51 and the arm cover 52. Furthermore, in addition to the gear group 69 and the reducer 70, grease (lubricating oil) 72 that functions as lubricating oil for the gears and air 73 are contained in the internal space SP in a sealed state. An attachment hole 53 formed of a screw hole that penetrates through a wall of the arm body part 51 and that is connected to the internal space SP is provided at a position, of the arm body part 51, located at the top in the orientation of the robot 1 shown in FIG. 1, and the relief unit 30 is attached to the attachment hole 53.

Figure 3:
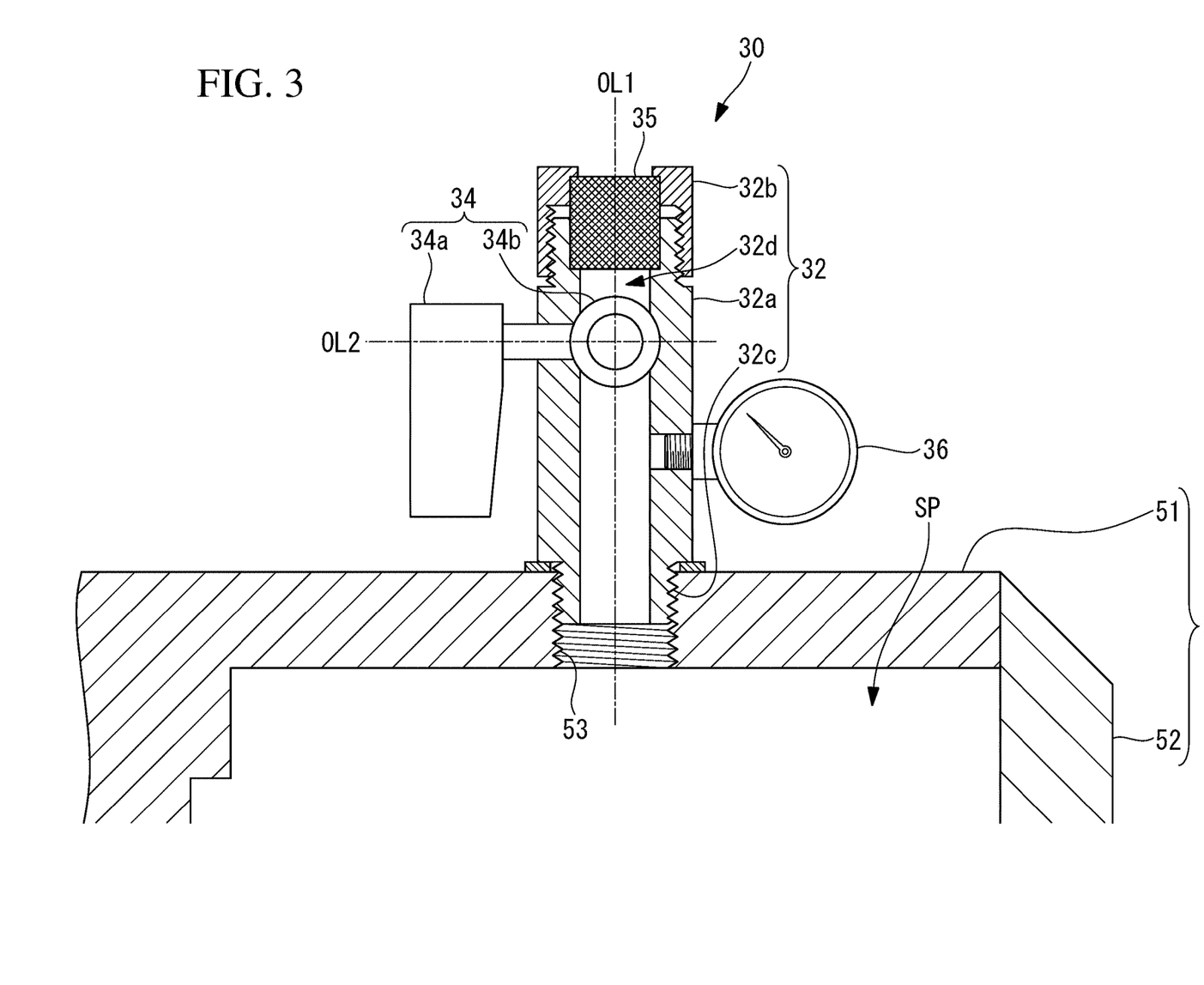
FIG. 3 is an enlarged sectional view of the relief unit.

As shown in FIG. 3, the relief unit 30 is provided with: a tubular unit body (body) 32 that forms a communication passage 32d; a ball valve (opening and closing mechanism) 34 that opens/closes the communication passage 32d; a filter (catching part) 35 that is disposed at an intermediate position of the communication passage 32d; and a pressure gauge (internal-pressure measurement unit) 36 that measures the pressure in the communication passage 32d.

The unit body 32 is provided with: a tubular body section 32a; a male thread section (attachment section) 32c that is provided at one end of the body section 32a in the direction of a longitudinal axis OL1 and that is fastened into the attachment hole 53 in the arm body part 51; and a filter fixing part 32b that is detachably attached to the body section 32a at the other end and that fixes the filter 35 in a sandwiched state between the body section 32a and the filter fixing part 32b.

The ball valve 34 is disposed at an intermediate position of the body section 32a in the direction of the longitudinal axis OL1. The ball valve 34 is provided with: a lever 34a that is capable of rotating about a rotation axis OL2 perpendicular to the longitudinal axis OL1; and an opening and closing valve 34b that opens/closes the communication passage 32d in response to the rotation of the lever 34a. The opening and closing valve 34b has a spherical external form connected to the lever 34a and has a passage that is formed therein and that penetrates a center section thereof in the diameter direction. By operating the lever 34a, the opening and closing valve 34b is switched between an open state in which the passage is made to match the communication passage 32d, thereby opening the internal space SP to the atmosphere, and a closed state in which the passage is disposed in a direction perpendicular to the communication passage 32d, thereby closing the communication passage 32d in a sealed state.

The filter fixing part 32b is detached from the body section 32a, thereby making it possible to replace the filter 35 in the relief unit 30. The filter 35 is a mesh-like member in which a plurality of holes having a maximum diameter of 10 micrometers ($\mu$m) or less are formed and is disposed along a cross-section of the communication passage 32d.

The pressure gauge 36 is attached between the ball valve 34 and the male thread section 32c, which are provided in and on the body section 32a. Specifically, in a state in which the male thread section 32c of the body section 32a is attached to the attachment hole 53 of the arm body part 51, the pressure gauge 36 is capable of measuring the pressure in the internal space SP of the arm body part 51 via the communication passage 32d connected to the internal space SP.

In the thus-configured robot 1 of this embodiment, when the second arm 6 is rotated about the third axis J3, the temperature of the internal space SP is increased by heat generation of the J3-axis motor 61 and heat generation due to engagement of the respective gears of the gear group 69, and, as a result, the pressure in the internal space SP is increased, in some cases. In such cases, the ball valve 34 of the relief unit 30 is opened, thereby making it possible to release the air 73 in the internal space SP, thus depressurizing the inside of the internal space SP.

The filter 35, which is disposed at a position so as to close the communication passage 32d, allows gas to flow therethrough and prevents the grease 72 from flowing therethrough. Therefore, when the internal space SP is depressurized, the grease 72 that is about to flow out together with the air 73 in the internal space SP is caught by the filter 35, thus making it possible to suppress leakage of the grease 72 from the internal space SP to the outside. Furthermore, because the filter 35 has a plurality of holes having a maximum diameter of 10 $\mu$m or less, the liquid-like grease 72 can be caught due to surface tension.

In the above-described embodiment, although a description has been given of examples of the relief unit 30 and the robot 1, to which the relief unit 30 is attached, the relief unit 30 and the robot 1 can be variously modified. For example, the robot 1 can be a robot other than the vertical articulated robot and can be any robot that has the internal space SP, which accommodates, together with the grease 72, a plurality of gears for transmitting the rotational driving force of a motor. Furthermore, although the relief unit 30 is attached to an outer peripheral surface of the arm body part 51 of the first arm 5, it is also possible to use relief units 30 to depressurize the internal spaces of the other arms. Specifically, the robot 1 may be provided with a plurality of relief units 30. As a method for attaching the relief unit 30 to the robot 1, it is possible to adopt a known method, such as a method that involves fitting of a recessed section and a protruding section and a method using other components. The relief unit 30 may be attached to a through-hole that is used to insert/remove the grease 72 into/from the internal space SP. Furthermore, lubricating oil for the gears is not limited to the grease in the above-described embodiment, and known lubricating oil can be used.

In the robot 1 of the above-described embodiment, although the measured pressure value of the internal space SP is measured and is indicated by means of the pressure gauge 36, the measured pressure value may be displayed on the monitor 23 of the teach pendant 20. Furthermore, instead of the relief unit 30, it is also possible to use a solenoid valve that can open/close the communication passage 32d in response to an operation received by the operation panel 22. In this case, for example, the operator can remotely control opening/closing of the solenoid valve in a state in which the operator confirms the pressure value of the internal space SP displayed on the monitor 23.

In the robot 1 that is provided with a solenoid valve serving as the relief unit 30, opening/closing of the solenoid valve may be controlled in accordance with the orientation of the robot 1. For example, because the solenoid valve rotates about the second axis J2 in accordance with the orientation of the first arm 5, which rotates about the second axis J2, in some cases, the solenoid valve is located below the arm body part 51 depending on the orientation of the first arm 5. In such cases, on the basis of the orientation of the first arm 5, only when the robot 1 is in an orientation in which the communication passage 32d is connected to the layer of the air 73 in the internal space SP, may the control device (opening and closing control unit) 2 perform control so as to open the solenoid valve. Accordingly, leakage of the grease 72 in the internal space SP to the outside is further suppressed, and then, the internal space SP can be depressurized. Furthermore, for the purpose of catching the grease 72, it is possible to adopt, for a filter, a known shape and material other than those of the filter 35, which is provided in the relief unit 30 of the above-described embodiment.

Figure 4:
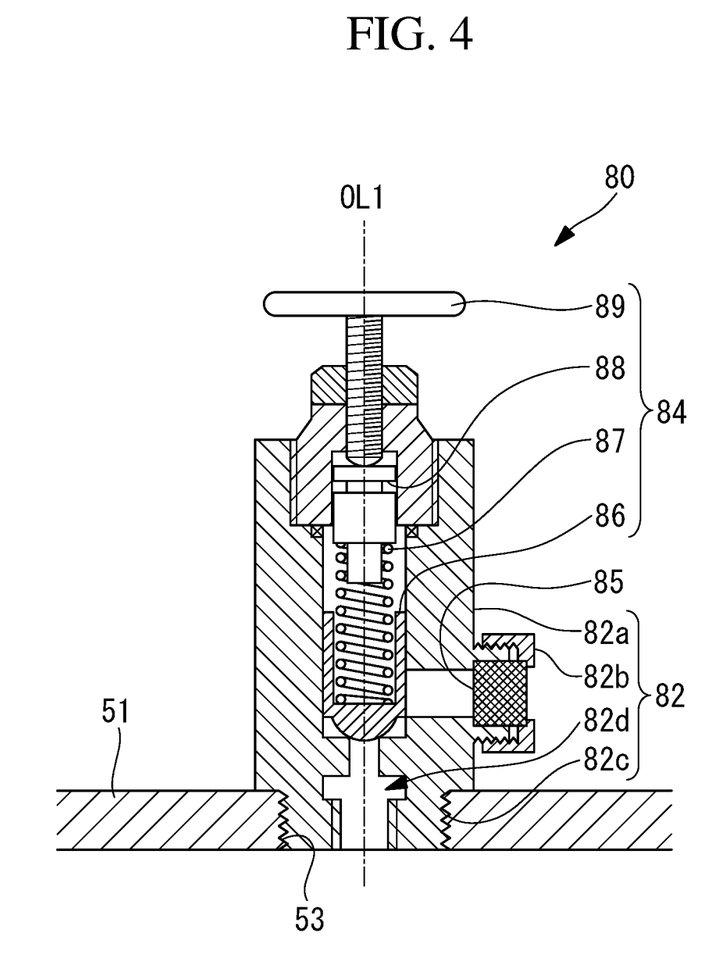
FIG. 4 is an enlarged sectional view of a relief unit according to a modification.

The relief unit may be a safety valve that is closed when the pressure value of the internal space SP is equal to or less than a predetermined pressure value and that is automatically opened when the pressure value of the internal space SP exceeds the predetermined pressure value. FIG. 4 is an enlarged sectional view of a safety valve (relief unit) 80 according to a modification. In a state in which a male thread section (attachment section) 82c of a unit body (body) 82 is attached to the attachment hole 53, a biasing spring 87 of an opening and closing mechanism 84 is biased in a direction in which an opening and closing valve 86 of the opening and closing mechanism 84 closes a communication passage 82d. The length of the biasing spring 87, which determines the biasing force of the biasing spring 87, is set according to the positions of a spool 88 and a lever 89 in the opening and closing mechanism 84 along the longitudinal axis OL1. By operating the lever 89, the positions of the lever 89 and the spool 88 are changed. Thus, the operator operates the lever 89, thereby making it possible to adjust the length of the biasing spring 87 and to set the predetermined pressure value based on which the opening and closing mechanism 84 is automatically opened. Note that the safety valve 80 of the modification connects the internal space to the outside via a filter (catching part) 85 that is disposed on a side surface of the unit body 82 and a filter fixing part 82b that is attached so as to be detachable from a body section 82a. Furthermore, instead of the safety valve 80, it is also possible to use a solenoid valve that is automatically opened/closed according to a pressure value. The pressure value, based on which the solenoid valve is opened/closed, may be set through an operation received by the operation panel 22.

Figure 5:
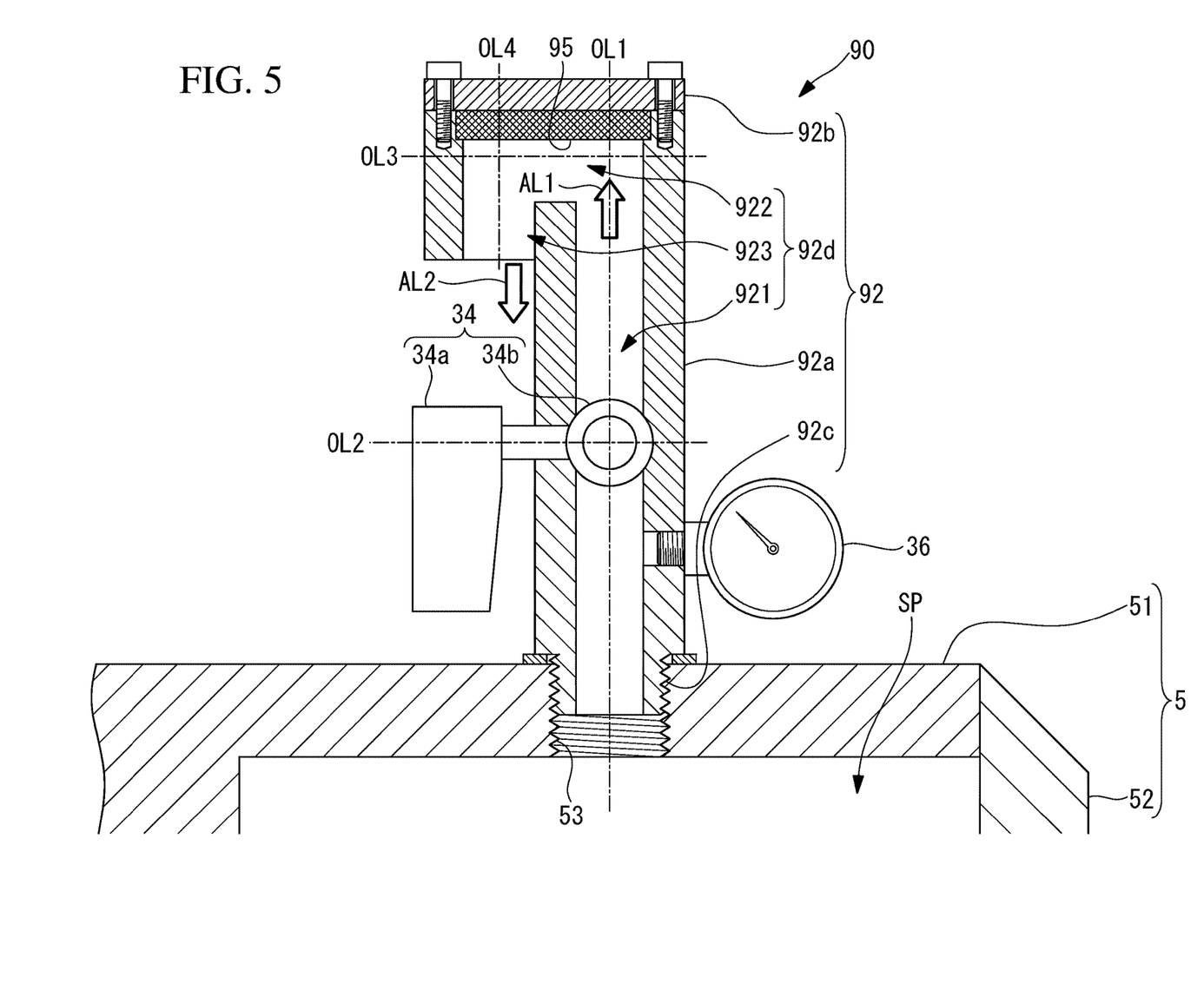
FIG. 5 is an enlarged sectional view of a relief unit according to another modification.

FIG. 5 is an enlarged sectional view showing a relief unit 90 according to another modification. The relief unit 90 differs from the relief unit 30 of the above-described embodiment in terms of a unit body (body) 92 and a grease catcher (catching part) 95 and is the same as that in terms of the other structures. Thus, here, the unit body 92 and the grease catcher 95 will be mainly described, and a description of the other structures will be omitted.

As shown in FIG. 5, the unit body 92 is provided with: a body section 92a and a catcher fixing part 92b that form a tubular communication passage 92d in which the central axis is changed; and a male thread section (attachment section) 92c that is fastened into the attachment hole 53. The communication passage 92d is provided with: a first communication passage 921 that is centered on a longitudinal axis (first longitudinal axis) OL1; a second communication passage 922 that is connected to the first communication passage 921 and that is centered on a perpendicular axis (second longitudinal axis) OL3; and a third communication passage 923 that is connected to the second communication passage 922, that is centered on a vertical axis OL4, and that is connected to the outside. Note that, as shown in FIG. 5, the first communication passage 921 and the second communication passage 922 have a shared partial region. Furthermore, similarly, the second communication passage 922 and the third communication passage 923 have a shared partial region.

The catcher fixing part 92b is fixed to the body section 92a, through bolt fastening, at an opposite end of the body section 92a from the male thread section 92c along the longitudinal axis OL1. The grease catcher 95 is disposed between the catcher fixing part 92b and the body section 92a. In other words, the grease catcher 95 is disposed at a position where the longitudinal axis OL1 intersects an inner surface of the catcher fixing part 92b, the inner surface forming the second communication passage 922. By detaching the catcher fixing part 92b from the body section 92a, the grease catcher 95 can be replaced, without detaching the relief unit 90 from the arm body part 51. The grease catcher 95 is formed of a material that easily absorbs grease.

In the relief unit 90 of the modification, which is shown in FIG. 5, when the ball valve 34 is opened to depressurize the internal space SP, the air in the internal space SP passes through the first communication passage 921, enters the second communication passage 922 along an arrow AL1, passes through the second communication passage 922, enters the third communication passage 923, and flows out from the third communication passage 923 to the outside along an arrow AL2. On the other hand, the grease in the internal space SP passes through the first communication passage 921, moves along the arrow AL1, collides with the grease catcher 95, which is disposed on an extension of the longitudinal axis OL1, and is then absorbed by the grease catcher 95. Specifically, the relief unit 90 of this modification can suppress leakage of the grease to the outside together with air, at the time of depressurizing of the internal space SP. In the relief unit 90, leakage of the grease to the outside can be suppressed irrespective of whether the grease catcher 95 interferes with a flow of air.

The relief unit 90 of the modification shown in FIG. 5 is merely an example, and the configuration and the shape of the relief unit 90 can be variously modified. For example, the communication passage 92d can be any passage other than a passage that is formed of only a tubular passage centered on the straight longitudinal axis OL1 and may be, for example, a passage that does not have the third communication passage 923, which extends along the vertical axis OL4. The central axis of the second communication passage 922 may intersect the longitudinal axis OL1 of the first communication passage 921 at an angle of 30° without being perpendicular thereto, or the longitudinal axis OL1 and the perpendicular axis OL3 may be connected in a smoothly curved manner.

Furthermore, the configuration and the shape of the grease catcher 95 can also be variously modified. For example, the grease catcher 95 may be made of a material that catches lubricating oil, such as grease, may be made of a paper-like material, or may be a plastic filter or the like. Furthermore, the position where the grease catcher 95 is disposed, shown in FIG. 5, is merely an example, and the grease catcher 95 may be disposed on a side surface of the first communication passage 921, the side surface being not on the longitudinal axis OL1. The grease catcher 95 in the modification and the filter 35 in the above-described embodiment may be both disposed at intermediate positions in the communication passage 92d.

As a result, the above-described embodiment leads to the following aspects.

One aspect of the present invention is directed to a relief unit that is attached to an attachment hole penetrating through a wall of a housing that accommodates a power transmission mechanism of a robot together with lubricating oil in a sealed state, the relief unit including: a body that is provided with an attachment section attachable to the attachment hole and that forms a communication passage disposed at a position where an internal space of the housing and an external space are connected when the attachment section is attached to the attachment hole; an opening and closing mechanism that is provided in the communication passage, that closes the communication passage in a sealed state when the opening and closing mechanism is closed, and that opens the communication passage when the opening and closing mechanism is opened; and a catching part that is disposed at an intermediate position of the communication passage and that catches the lubricating oil.

According to this aspect, the communication passage of the relief unit, which is attached to the attachment hole of the robot by means of the attachment section, allows the inside and the outside of the housing to communicate with each other. By opening/closing the communication passage by means of the opening and closing mechanism, the housing is switched between a sealed state and a state in which the housing communicates with the outside of the housing. The opening and closing mechanism is opened when the internal pressure of the housing is increased, thereby allowing the pressurized air in the housing to flow to the outside of the housing, thus depressurizing the inside of the housing. At this time, because the lubricating oil in the housing is caught by the catching part, the lubricating oil does not leak to the outside of the housing, together with the air.

The relief unit is attached only when the inside of the housing is depressurized, and is detached from the robot when the inside of the housing is not depressurized, thereby making it possible to suppress an increase in the installation space for the robot. Furthermore, with a simple structure having the communication passage, the catching part, which is disposed in the communication passage, and the opening and closing mechanism, which opens/closes the communication passage, the relief unit can suppress leakage of the lubricating oil in the housing to the outside during depressurization. By preventing the lubricating oil from leaking, contamination of the surrounding environment with the lubricating oil can be suppressed.

In the above-described aspect, the catching part may be replaceable.

By replacing only the catching part, replacement of the entirety of the relief unit is not required, thus making it possible to reduce the cost of the relief unit, which is continuously used.

In the above-described aspect, the catching part may be provided at an opposite side of the opening and closing mechanism from the attachment section.

By doing so, when the relief unit is attached to the robot, the catching part is disposed closer to the outside of the housing than the opening and closing mechanism is. Thus, in a state in which the opening and closing mechanism is closed, i.e., in a state in which the air and the lubricating oil in the housing do not leak, replacement work of the catching part can be safely performed.

The above-described aspect may further include a pressure gauge that measures the pressure in the communication passage on the side of the attachment section with respect to the opening and closing mechanism.

By doing so, when the relief unit is attached to the robot, the internal pressure of the housing is measured by means of the pressure gauge, and the opening and closing mechanism can be opened/closed according to the measured pressure value.

In the above-described aspect, the opening and closing mechanism may be closed at a predetermined pressure value or less and may be opened at above the predetermined pressure value.

In this way, by setting the predetermined pressure value in advance, because the opening and closing mechanism is automatically opened/closed on the basis of the predetermined pressure value, even if the internal pressure of the housing is not monitored, it is possible to keep the internal pressure of the housing to the predetermined pressure value or less.

In the above-described aspect, the predetermined pressure value may be changeable.

By doing so, the pressure value for opening/closing the opening and closing mechanism can be changed depending on the housing to which the relief unit is attached.

In the above-described aspect, the catching part may be a filter that allows gas to flow therethrough and that prevents the lubricating oil from flowing therethrough.

By doing so, for example, even if the communication passage has a simple straight shape, the filter, which is disposed at an intermediate position of the communication passage, catches the lubricating oil, thus making it possible to realize the relief unit having a simple structure.

In the above-described aspect, the catching part may be a mesh-like member that is disposed along a cross-section of the communication passage and that has a plurality of holes having a maximum diameter of 10 micrometers or less.

By doing so, it becomes easier for the catching part to catch the lubricating oil, which is liquid.

In the above-described aspect, the communication passage may be provided with: a first communication passage that is connected to the internal space of the housing when the attachment section is attached to the attachment hole and that extends along a first longitudinal axis; and a second communication passage that is connected to the first communication passage and that extends along a second longitudinal axis intersecting the first longitudinal axis; and the catching part may be disposed at a position at which an extension of the first longitudinal axis and the body, which forms the second communication passage, intersect.

By doing so, because the first communication passage and the second communication passage are connected at an angle, the lubricating oil, which has passed through the first communication passage from the internal space when the inside of the housing is depressurized, collides with an inner periphery of the body, the inner periphery forming the second communication passage, when entering the second communication passage from the first communication passage. Because the catching part is disposed at the collision section, the lubricating oil is caught by the catching part. Accordingly, the lubricating oil does not leak to the outside of the housing together with air.

Furthermore, another aspect of the present invention is directed to a robot including: a motor; a mechanism part that is driven by power of the motor; a power transmission mechanism that transmits the power of the motor to the mechanism part; a housing that accommodates the power transmission mechanism together with lubricating oil in a sealed state; and a relief unit according to the above-described aspect, that is attached to an attachment hole penetrating through a wall of the housing, by means of the attachment section.

According to this aspect, the communication passage of the relief unit, which is attached to the robot, allows the inside and the outside of the housing to communicate with each other, via the attachment hole. By opening/closing the communication passage by means of the opening and closing mechanism, the housing is switched between a sealed state and a state in which the housing communicates with the outside of the housing. Even if the internal pressure of the housing is increased due to friction heat of the power transmission mechanism generated when the power of the motor is transmitted to the mechanism part via the power transmission mechanism and due to heat generation of the motor, the opening and closing mechanism is opened, thereby allowing the pressurized air in the housing to flow to the outside of the housing, thus depressurizing the inside of the housing. At this time, because the lubricating oil in the housing is caught by the catching part, the lubricating oil does not leak to the outside of the housing, together with the air.

The above-described aspect may further include: an internal-pressure measurement unit that measures the internal pressure of the housing; and a display unit that displays the internal pressure measured by the internal-pressure measurement unit.

By doing so, the internal pressure of the housing, which is displayed on the display unit, is monitored, and, when the internal pressure is high, the opening and closing mechanism is opened, thereby making it possible to depressurize the inside of the housing.

In the above-described aspect, the display unit may be disposed in a vicinity of the attachment hole.

By doing so, while checking the internal pressure of the housing, which is displayed on the display unit, the opening and closing mechanism of the relief unit, which is attached to the attachment hole, can be opened/closed.

The above-described aspect may further include an operation unit that receives an operation for opening/closing the opening and closing mechanism, wherein the display unit may be formed integrally with the operation unit.

By doing so, the display unit need not be disposed in the vicinity of the attachment hole of the housing, thus making it possible to clear the area surrounding the mechanism part. Furthermore, because the display unit and the operation unit are integrally formed, it is possible to remotely operate opening/closing of the opening and closing mechanism while checking the internal pressure of the housing, which is displayed on the display unit.

In the above-described aspect, the opening and closing mechanism may be closed at a predetermined pressure value or less and may be opened at above the predetermined pressure value; and the predetermined pressure value may be changed on the basis of the operation received by the operation unit.

By doing so, the predetermined pressure value can be remotely set by operating the operation unit. Furthermore, because the opening and closing mechanism is automatically opened/closed on the basis of the set predetermined pressure value, even if the pressure in the housing is not monitored, it is possible to keep the pressure in the housing to the predetermined pressure value or less.

The above-described aspect may further include an opening and closing control unit that controls power of the motor on the basis of the operation received by the operation unit and that controls opening/closing of the opening and closing mechanism according to an orientation of the mechanism part, which is driven by the controlled power of the motor.

By doing so, in a case where the mechanism part is oriented such that the relief unit is located vertically above the housing, the communication passage communicates with the air layer in the housing. In this case, the opening and closing mechanism is opened, thereby making it possible to depressurize the housing. On the other hand, in a case where the mechanism part is oriented such that the relief unit is located vertically below the housing, the communication passage communicates with the lubricating-oil layer in the housing, not with the air layer. In this case, the opening and closing mechanism is closed, thereby making it possible to suppress leakage of the lubricating oil to the outside of the housing.

According to the present invention, an advantageous effect is afforded in that an increase in the installation space and the cost of a robot is suppressed, and leakage of lubricating oil in a housing to the outside is suppressed.

REFERENCE SIGNS LIST 1 robot
2 control device (opening and closing control unit)
5 first arm (housing)
6 second arm (mechanism part)
22 operation panel (operation unit)
23 monitor (display unit)
30 relief unit
32 unit body (body)
32c male thread section (attachment section)
32d communication passage
34 ball valve (opening and closing mechanism)
35 filter (catching part)
36 pressure gauge (internal-pressure measurement unit)
53 attachment hole
61 J3-axis motor (motor)
69 gear group (power transmission mechanism)
72 grease (lubricating oil)
80 safety valve (relief unit)
82 unit body (body)
82c male thread section (attachment section)
82d communication passage
85 filter (catching part)
90 relief unit
92 unit body (body)
92d communication passage
92c male thread section (attachment section)
95 grease catcher (catching part)
OL1 longitudinal axis (first longitudinal axis)
OL3 perpendicular axis (second longitudinal axis)
921 first communication passage
922 second communication passage

The invention claimed is:

1. A relief unit attached to an attachment hole penetrating through a wall of a housing that accommodates a power transmission mechanism of a robot together with lubricating oil in a sealed state, the relief unit comprising:
a body provided with an attachment section attachable to the attachment hole and that forms a communication passage disposed at a position where an internal space of the housing and an external space are connected when the attachment section is attached to the attachment hole;
an opening and closing mechanism that is provided in the communication passage, that closes the communication passage in a sealed state when the opening and closing mechanism is closed, and that opens the communication passage when the opening and closing mechanism is opened; and
a catching part that is disposed at an intermediate position of the communication passage and that catches the lubricating oil, wherein the opening and closing mechanism is closed at a predetermined pressure value or less and is opened above the predetermined pressure value, and wherein the predetermined pressure value is adjustable.

2. The relief unit according to claim 1, wherein the catching part is replaceable.

3. The relief unit according to claim 2, wherein the catching part is provided at an opposite side of the opening and closing mechanism from the attachment section.

4. The relief unit according to claim 1, further comprising a pressure gauge that measures a pressure in the communication passage on a side of the attachment section with respect to the opening and closing mechanism.

5. The relief unit according to claim 1, wherein the catching part is a filter that allows gas to flow therethrough and that prevents the lubricating oil from flowing therethrough.

6. The relief unit according to claim 1, wherein the catching part is a mesh-like member that is disposed along a cross-section of the communication passage and that has a plurality of holes having a maximum diameter of 10 micrometers or less.

7. The relief unit according to claim 1, wherein the predetermined pressure value is changeable via rotation of at least one part of the opening and closing mechanism.

8. The relief unit according to claim 1, wherein the communication passage comprises: a first communication passage that is connected to the internal space of the housing when the attachment section is attached to the attachment hole and that extends along a first longitudinal axis; and a second communication passage that is connected to the first communication passage and that extends along a second longitudinal axis intersecting the first longitudinal axis; and the catching part is disposed at a position at which an extension of the first longitudinal axis and the body, which forms the second communication passage, intersect.

9. A robot comprising:

a motor;

a mechanism part that is driven by power of the motor;

a power transmission mechanism that transmits the power of the motor to the mechanism part;

a housing that accommodates the power transmission mechanism together with lubricating oil in a sealed state; and a relief unit attached to an attachment hole penetrating through a wall of the housing, by means of the attachment section, an internal-pressure measurement unit that measures an internal pressure of the housing;

a display unit that displays the internal pressure measured by the internal-pressure measurement unit; and an operation unit that receives an operation for opening/closing the opening and closing mechanism, wherein the relief unit is attached to the attachment hole penetrating through the wall of the housing that accommodates the power transmission mechanism of the robot together with lubricating oil in a sealed state, the relief unit comprising:

a body provided with an attachment section attachable to the attachment hole and that forms a communication passage disposed at a position where an internal space of the housing and an external space are connected when the attachment section is attached to the attachment hole;

an opening and closing mechanism that is provided in the communication passage, that closes the communication passage in a sealed state when the opening and closing mechanism is closed, and that opens the communication passage when the opening and closing mechanism is opened, and a catching part that is disposed at an intermediate position of the communication passage and that catches the lubricating oil, and wherein the display unit is formed integrally with the operation unit.

10. The robot according to claim 9, wherein the display unit is disposed in a vicinity of the attachment hole.

11. The robot according to claim 9, wherein the opening and closing mechanism is closed at a predetermined pressure value or less and is opened at above the predetermined pressure value; and the predetermined pressure value is changed on a basis of the operation received by the operation unit.

12. The robot according to claim 9, further comprising an opening and closing control unit that controls the power of the motor on a basis of the operation received by the operation unit and that controls opening/closing of the opening and closing mechanism according to an orientation of the mechanism part, which is driven by the controlled power of the motor.

13. A relief unit attached to an attachment hole penetrating through a wall of a housing that accommodates a power transmission mechanism of a robot together with lubricating oil in a sealed state, the relief unit comprising:

a body provided with an attachment section attachable to the attachment hole and that forms a communication passage disposed at a position where an internal space of the housing and an external space are connected when the attachment section is attached to the attachment hole;

an opening and closing mechanism that is provided in the communication passage, that closes the communication passage in a sealed state when the opening and closing mechanism is closed, and that opens the communication passage when the opening and closing mechanism is opened; and a catching part that is disposed at an intermediate position of the communication passage and that catches the lubricating oil, wherein the communication passage comprises: a first communication passage that is connected to the internal space of the housing when the attachment section is attached to the attachment hole and that extends along a first longitudinal axis; and a second communication passage that is connected to the first communication passage and that extends along a second longitudinal axis intersecting the first longitudinal axis; and the catching part is disposed at a position at which an extension of the first longitudinal axis and the body, which forms the second communication passage, intersect.

14. The relief unit according to claim 13, wherein the catching part is replaceable.

15. The relief unit according to claim 14, wherein the catching part is provided at an opposite side of the opening and closing mechanism from the attachment section.

16. The relief unit according to claim 13, further comprising a pressure gauge that measures a pressure in the communication passage on a side of the attachment section with respect to the opening and closing mechanism.

17. The relief unit according to claim 13, wherein the catching part is a filter that allows gas to flow therethrough and that prevents the lubricating oil from flowing therethrough.

18. The relief unit according to claim 13, wherein the catching part is a mesh-like member that is disposed along a cross-section of the communication passage and that has a plurality of holes having a maximum diameter of 10 micrometers or less.

* * * * *